United States Patent
Hayashi et al.

(10) Patent No.: US 6,283,009 B1
(45) Date of Patent: Sep. 4, 2001

(54) SWASH PLATE TYPE HYDRAULIC UNIT (75) Inventors: Tsutomu Hayashi; Yoshihiro Nakajima; Hideo Okuzaki; Masako Takahashi, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/485,694

(22) PCT Filed: Aug. 21, 1998

(86) PCT No.: PCT/JP98/03702

§ 371 Date: Feb. 25, 2000

§ 102(e) Date: Feb. 25, 2000

(87) PCT Pub. No.: WO99/13222

PCT Pub. Date: Mar. 18, 1999

(30) Foreign Application Priority Data

Sep. 11, 1997 (JP) .................................................. 9-246857

(51) Int. Cl.[7] ............................... F01B 3/00; F16D 31/02
(52) U.S. Cl. ................................. 92/71; 91/499; 60/478
(58) Field of Search ................................. 92/71; 91/499, 91/500, 502; 60/478

(56) References Cited

U.S. PATENT DOCUMENTS

| | | | |
|---|---|---|---|
| 2,231,100 | * 2/1941 | Wahlmark | 121/119 |
| 2,955,475 | * 10/1960 | Zubaty | 74/60 |
| 4,950,132 | * 8/1990 | Brian, Jr. et al. | 417/269 |
| 5,528,976 | * 6/1996 | Ikeda et al. | 92/71 |

FOREIGN PATENT DOCUMENTS

| | | | |
|---|---|---|---|
| 54-15503 | 2/1979 | (JP) . | |
| 63-203959 | 8/1988 | (JP) . | |
| 7-167041 | 7/1995 | (JP) . | |
| 9-151839 | 6/1997 | (JP) . | |
| 11-82672-A | * 3/1999 | (JP) | F16H/39/14 |

* cited by examiner

Primary Examiner—Timothy S. Thorpe
Assistant Examiner—Timothy P. Solak
(74) Attorney, Agent, or Firm—Arent Fox Kintner Plotkin & Kahn, PLLC (57) ABSTRACT

In a swash plate type hydraulic unit for use as a swash plate type hydraulic pump and a hydraulic motor, a plurality of block plates $4_1$ to $4_5$ being divided at split planes extending orthogonal to a cylinder block axis X are soldered to one another to form a cylinder block 4. Inlet holes 25$i$ and 39$i$ for supporting plungers 27 and 41 slidably therein are formed in an inlet-side one of the block plates $4_1$, $4_2$; $4_4$, $4_5$ located close to plunger swash plates 9$a$ and 19$a$, while in remaining inner-side ones of the block plates $4_3$ to $4_5$; $4_1$ to $4_3$ are formed inner holes 25$o$ and 39$o$ of a diameter larger than that of the inlet holes 25$i$ and 39$i$, the inner holes 25$o$ and 39$o$ each defining an oil chamber to which the outer peripheral surface of the associated plunger 27, 41 faces. With this arrangement, a cylinder block structure superior in mass-productivity is provided.

5 Claims, 11 Drawing Sheets

SWASH PLATE TYPE HYDRAULIC UNIT

FIELD OF THE INVENTION

The present invention relates to a swash plate type hydraulic unit for use as a swash plate type hydraulic pump and a hydraulic motor, and particularly, to an improvement of a swash plate type hydraulic unit comprising a cylinder block having a large number of cylinder bores arranged annularly in parallel with a cylinder block axis on a pitch circle which surrounds the axis; a large number of plungers slidably fitted respectively in the cylinder bores; and a plunger swash plate for rotating relatively with respect to the cylinder block, thereby causing the plungers to reciprocate.

PRIOR ART

In the above conventional swash plate type hydraulic unit, cylinder bores are formed in a solid cylinder block (see, for example, Japanese Patent Application Laid-open No. 63-203959).

However, since cylinder bores with plungers slidably fitted therein are fairly deep, a long time is required for forming them in the solid cylinder block, and this point is an obstacle to mass production of the hydraulic unit.

The present invention has been accomplished in view of the above-mentioned circumstances and it is an object of the invention to provide the foregoing swash plate type hydraulic unit in which a cylinder block having a large number of cylinder bores can be obtained efficiently, and moreover, even if the shapes of ports formed in the cylinder bores are complicated, the ports can easily be formed.

DISCLOSURE OF THE INVENTION

For achieving the above-mentioned object, according to the present invention, there is proposed a swash plate type hydraulic unit comprising a cylinder block having a large number of cylinder bores arranged annularly in parallel with a cylinder block axis on a pitch circle which surrounds the said axis; a large number of plungers slidably fitted respectively in the cylinder bores; and a plunger swash plate for rotating relatively with respect to the cylinder block, thereby causing the plungers to reciprocate, characterized in that the cylinder block is formed by combining a plurality of block plates with one another, the block plates being divided at split planes extending orthogonal to the cylinder block axis; the cylinder bores are comprised of inlet holes for supporting corresponding plungers slidably and inner holes of a diameter larger than that of the inlet holes, the inlet holes being formed in an inlet-side one of the block plates positioned on a side which faces the plunger swash plate, the inner holes being formed in remaining inner-side ones of the block plates positioned on the side opposite to the plunger swash plate to each define an oil chamber between the inner hole and the outer peripheral surface and end surface of the corresponding plunger; the cylinder block has positioning means for coaxially arranging the cylinder bores in the block plates, and the cylinder block is provided with a plurality of valve holes having distributing valves mounted therein; and ports of the respective cylinder bores are formed in groove shapes in the split plane of a part of the block plates so as to be controlled selectively by the distributing valves.

According to this feature, since many inlet holes or inner holes formed in the block plates are relatively shallow, the mass production of the block plates having such a large number of holes is easy, and therefore by combining such block plates with one another while positioning them with use of positioning means, there can be obtained the cylinder block efficiently. In this case, even if there is a slight error in machining or assembly, such an error can be absorbed by the difference in diameter between the inlet holes and the inner holes of a diameter larger than that of the inlet holes, so causes no obstacle to the sliding motion of each plunger. This means that even if the inner hole machining accuracy is made rough, it is possible to decrease the percent defective of products and make contribution to a further improvement of mass-productivity.

Besides, in each of the inner holes, since there is formed an oil chamber to which not only the inner end surface of the associated plunger but also the outer peripheral surface thereof faces, the sliding surface of the plunger can always be maintained in a state of satisfactory lubrication by the hydraulic oil present in the oil chamber.

Moreover, the ports of the cylinder bores which are controlled selectively by the distributing valves are formed in groove shapes in the split plane of a part of the block plates. Therefore, even if the ports are of complicated shapes, they can easily be formed, thereby enhancing the productivity of the cylinder block in cooperation with the inlet holes and inner holes of each of the cylinder bores being easily formed.

In addition to the above feature, there is proposed a swash plate type hydraulic unit characterized in that a large number of valve holes are formed through the plural block plates annularly in parallel with the cylinder block axis on a pitch circle separate from and concentric with the foregoing pitch circle, spool type distributing valves are slidably fitted in the valve holes, a valve swash plate is arranged to reciprocate relatively with respect to the cylinder block thereby causing the associated distributing valves to reciprocate and the valve swash plate and the associated plunger swash plate are disposed on the same slant plane and are formed integrally with each other to form a swash plate assembly, and the ports of the respective cylinder bores are disposed so as to be controlled selectively by the distributing valves at positions out of phase by 90° in the circumferential direction of the cylinder block with respect to the cylinder pores.

According to this feature, since the ports of each of the cylinder bores are formed so as to be controlled selectively by the associated distributing valves at positions out of phase by 90° in the circumferential direction of the cylinder block with respect to the cylinder bores, it becomes possible to dispose both the plunger swash plate and valve swash plate on the same slant plane and the production of a swash plate assembly having both the swash plates becomes easy.

In addition to the above feature, if positioning pins are inserted into a series of positioning holes formed axially in all of the block plates, thereby forming the positioning means, and the block plates are bonded together with solder, and the block plates and the positioning pins are also bonded together with solder, the positioning of the block plates with respect to one another can be done easily and accurately. Besides, since solder is applied not only between adjacent block plates but also between the positioning pin and the associated block plate, the bonding between adjacent block plates can be strengthened by the positioning pin.

In addition to the above feature, if annular grooves capable of holding a solder material therein are formed in the outer peripheries of the plural block plates which are axially superimposed together so as to face the split planes of the block plates, prior to the bonding, the solder material can be placed easily and accurately at positions which face the split planes of the block plates on the outer peripheries of the block plates. Therefore, when the solder material is heat-melted, they can be penetrated between adjacent bonding surfaces positively without waste.

Further, in addition to the above feature, if the thickness of each of the block plates is set to a value which permits press working for the plate, each of the block plates can be subjected to press working and hence it is possible to further enhance the mass-productivity.

BEST MODE FOR CARRYING OUT THE INVENTION

The mode for carrying out the present invention will be described hereinafter by way of embodiments thereof illustrated in the accompanying drawings.

First, with reference to FIGS. 1 to 11, a description will be given below of the first embodiment in which the present invention is applied to a swash plate type continuously variable transmission.

Figure 1:
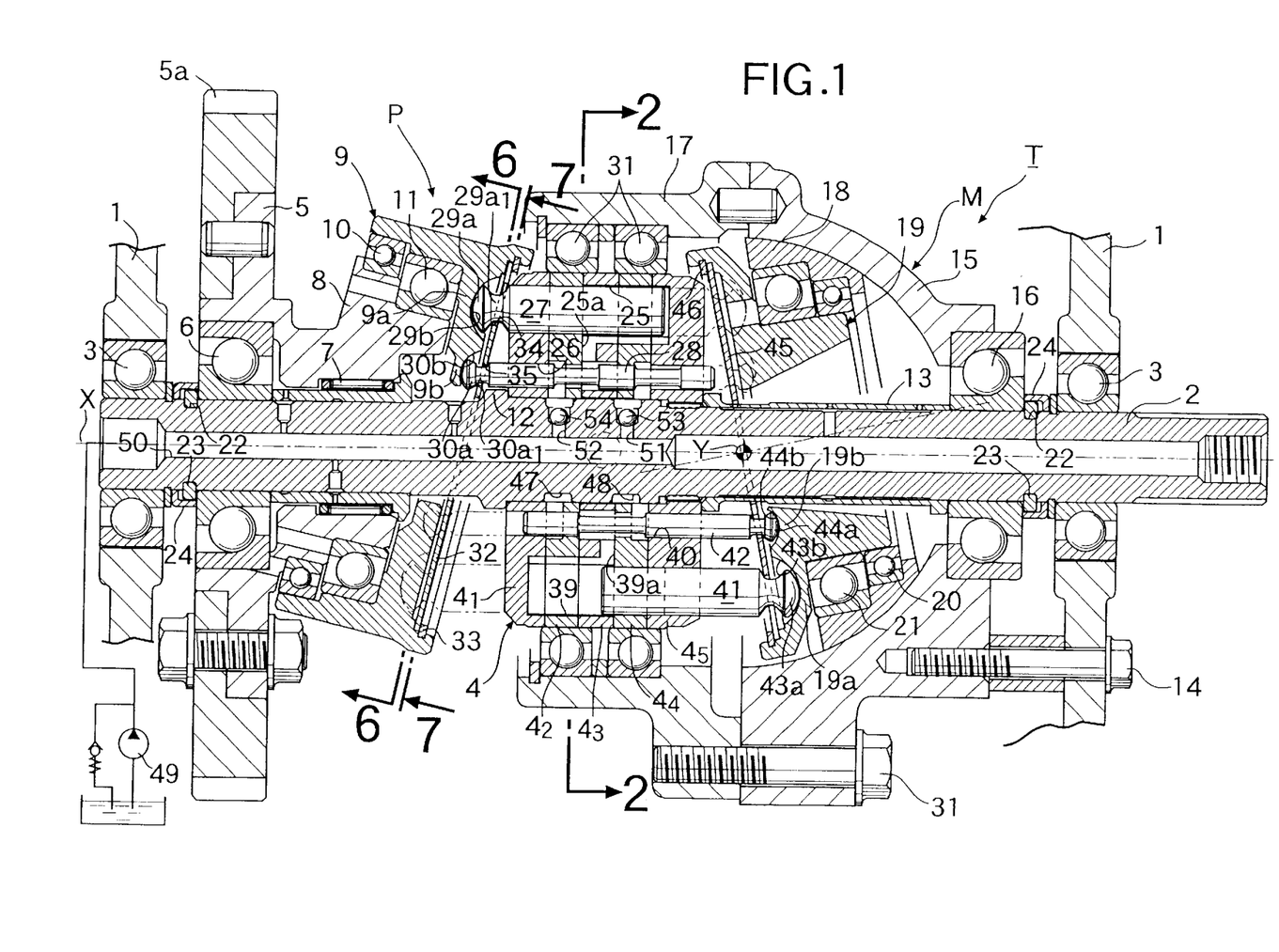
FIG. 1 is a side view in longitudinal section of a continuously variable transmission according to the first embodiment of the present invention.
Figure 2:
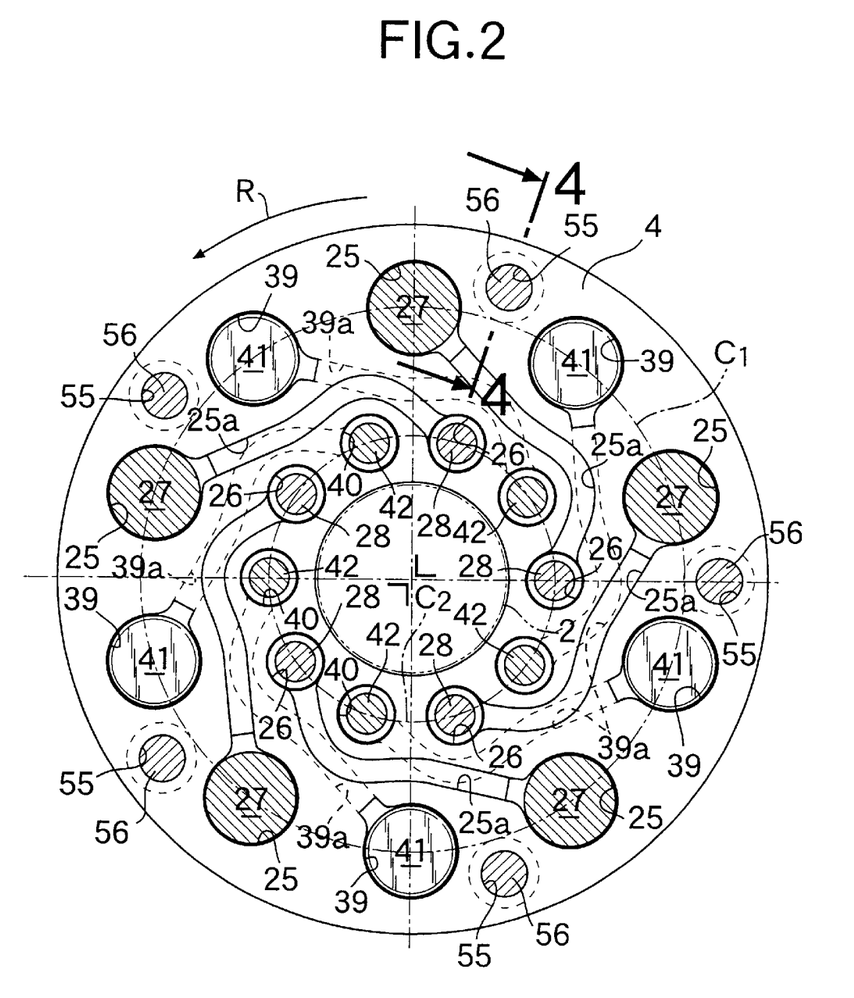
FIG. 2 is a sectional view taken on line 2—2 in FIG. 1.

In FIGS. 1 and 2, an output shaft 2 is supported through ball bearings 3, 3 in both right and left end walls of a transmission case 1 which accommodates a swash plate type continuously variable transmission, indicated at T. An input member 5 with an input gear 5a fixed thereto is supported on the output shaft 2 at a position adjacent to the left-end wall of the transmission case 1 rotatably through an angular contact bearing 6. The power of an engine (not shown) is inputted to the input gear 5a and is outputted from the right end portion of the output shaft 2 to a load (not shown), say, a drive unit in a two-wheeled motor vehicle.

Integral with the input member 5 is a swash plate holder 8 which is supported on the output shaft 2 through a needle bearing 7, and a first swash plate assembly 9 is held by the swash plate holder 8 rotatably through a ball bearing 10 and an angular contact bearing 11. The first swash assembly 9 is integrally provided with a pump swash plate 9a (plunger swash plate) and a first valve swash plate 9b which is enclosed with the pump swash plate 9a and which is disposed on the same slant plane as the pump swash plate 9a. The swash plate holder 8 is disposed so as to cause the pump swash plate 9a and the first valve swash plate 9b to be inclined at a predetermined angle with respect to an axis X of the output shaft 2.

A cylinder block 4 concentric with the output shaft 2 is splined to an intermediate portion of the output shaft 2 and is fixed axially immovably by both of a flange 12 and a sleeve 13 on the output shaft 2.

On the side opposite to the first swash plate assembly 9 with respect to the cylinder block 4, a swash plate anchor 15, which is fixed to the transmission case 1 with a bolt 14, is supported on the output shaft 2 through an angular contact bearing 16. A semicylindrical trunnion 18 having an axis Y orthogonal to the axis X of the output shaft 2 is supported by the swash plate anchor 15 so as to be rotatable in a predetermined angular range. Centrally of the trunnion 18 is supported a second swash plate assembly 19 rotatably through a ball bearing 20 and an angular contact bearing 21. The second swash plate assembly 19 is integrally provided with a motor swash plate 19a (plunger swash plate) and a second valve swash plate 19b which is enclosed with the motor swash plate 19a and which is disposed on the same slant plane as the motor swash plate 19a. The trunnion 18 is provided with an actuating arm (not shown) at one axial end thereof. The trunnion 18 is rotated by the actuating arm, whereby the tilting angle of the motor swash plate 19a and that of the second valve swash plate 19b relative to the axis X of the output shaft 2 can be changed.

A cylinder holder 17, which holds the cylinder block 4 rotatably through ball bearings 31, is fixed to the swash plate anchor 15 with bolt 38.

Thus, the left-hand angular contact bearing 6 mounted on the output shaft 2 supports the input member 5 and the first swash plate assembly 9, and the right-hand angular contact bearing 16 mounted on the output shaft 2 supports the swash plate anchor 15. Bisplit cotters 23, 23 engaged with a pair of annular grooves 22, 22 formed on the output shaft 2 are in abutment with the outer side surfaces of the left and right angular contact bearings 6, 16, respectively, with a retainer ring 24 being fitted on the outer periphery of each of the cotters 23. Upon operation of the continuously variable transmission T, a thrust load developed between the first swash plate assembly 9 and the cylinder block 4 is borne by the output shaft 2 through the left and right angular contact bearings 6, 16 and then through the left and right cotters 23, 23, while a thrust load generated between the swash plate anchor 15 and the cylinder block 4 is borne by the output shaft 2 through the flange 12 and the right-hand cotter 23, whereby the load on the transmission case 1 can be diminished.

In the cylinder block 4, a large odd-number (five in the illustrated embodiment) of pump cylinder bores 25 are formed in an annularly arranged state on a first pitch circle $C_1$ (see FIG. 2) which is concentric with the cylinder block 4. Further, first valve holes 26 are formed in the same number as the pump cylinder bores 25 and in an annularly arranged state on a second pitch circle $C_2$ which is smaller in diameter than and concentric with the first pitch circle $C_1$. One ends of the pump cylinder bores 25 are open to the left end surface of the cylinder block 4, while the opposite ends thereof are closed. The first valve holes 26 are formed smaller in diameter than the pump cylinder bores 25 and extend axially through the cylinder block 4.

Pump plungers 27 and spool type first distributing valves 28 are slidably fitted in the pump cylinder bores 25 and the first valve holes 26, respectively. Front ends of the pump plungers 27 and the first distributing valves 28 are projected from the left end surface of the cylinder block 4 into abutment with the pump swash plate 9a and the first valve swash plate 9b, respectively. While the input member 5 rotates, the pump swash plate 9a and the first valve swash plate 9b impart axial reciprocating motions to the pump plungers 27 and the first distributing valves 28, respectively, and a swash plate type hydraulic pump P (a swash plate type hydraulic unit) is formed by them.

Figure 6:
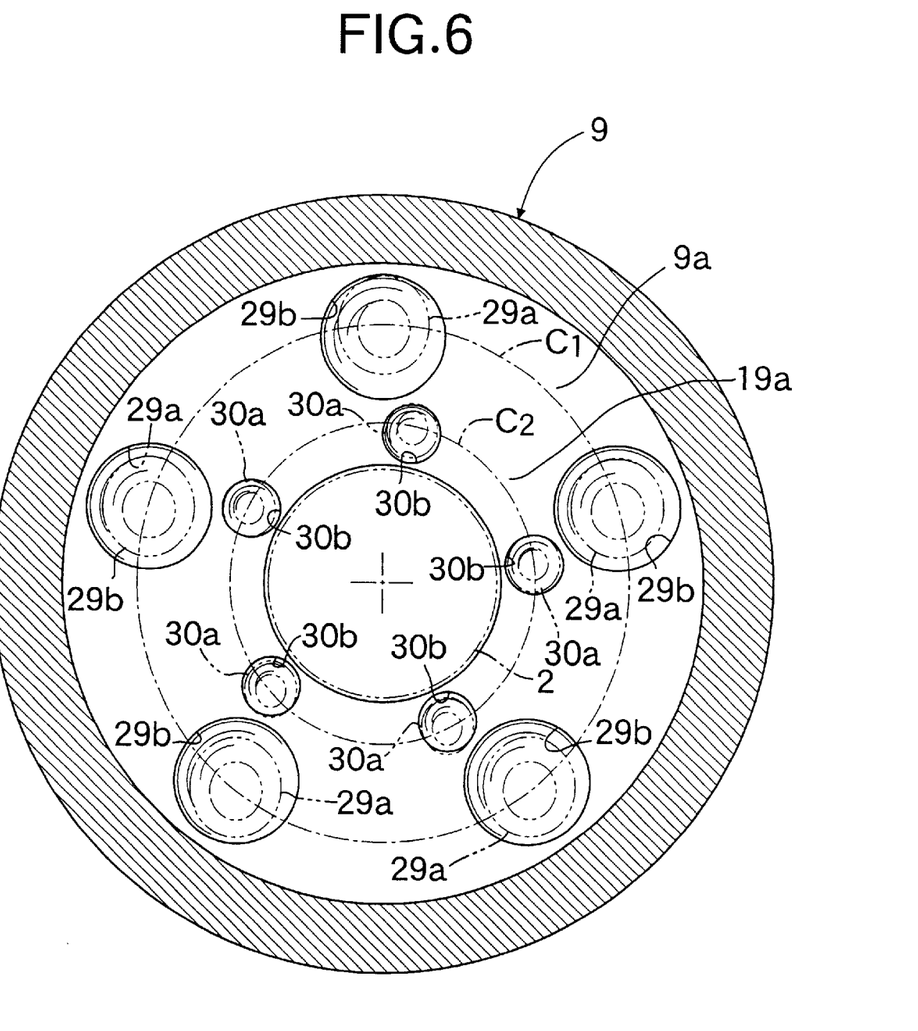
FIG. 6 is a sectional view taken on line 5—5 in FIG. 1.

As shown in FIGS. 1 and 6, the front ends of the pump plungers 27 and the first distributing valves 28 are formed as spherical ends 29a and 30a, respectively, and spherical recesses 29b and 30b for engagement with the spherical ends 29a and 30a are formed in the pump swash plates 9a and the first valve swash plate 9b, respectively, the spherical recesses 29b and 30b being larger in diameter than the spherical ends 29a and 30a, respectively. According to this construction, the slippage in the rotational direction between the pump swash plate 9a and the pump plungers 27 and that between the first valve swash plate 9b and the first distributing valve 28 are prevented, and moreover, bending moments exerted on the pump plungers 27 and the first distributing valves 28 from the respective associated swash plates 9a and 9b can be diminished.

Figure 7:
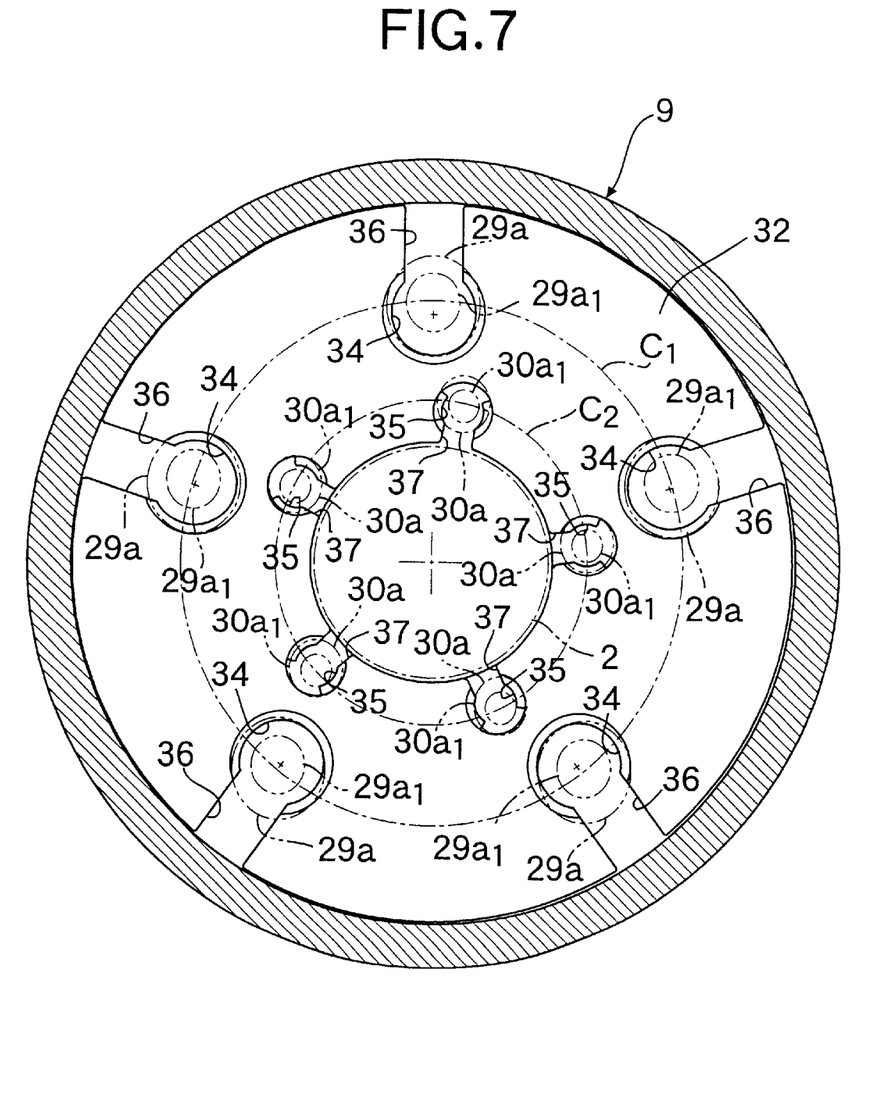
FIG. 7 is a sectional view taken on line 6—6 in FIG. 1.

As shown in FIGS. 1 and 7, an annular retainer plate 32 for holding the spherical ends 29a and 30a of the pump plungers 27 and the first distributing valves 28 in an engaged state with the corresponding spherical recesses 29b and 30b of the swash plates 9a and 9b is attached to the first swash plate assembly 9 rotatably with a cir-clip 33. In the retainer plate 32 are formed plunger retaining holes 34 corresponding to and in the same number as the annularly arranged pump plungers 27 and valve retaining holes 35 corresponding to and in the same number as the annularly arranged first distributing valves 28. The plunger retaining holes 34 are each formed smaller in diameter than the spherical end 29a of each of the pump plungers 27 and larger in diameter than a neck portion $29a_1$ of the spherical end 29a, and are each opened to the outer periphery of the retainer plate 32 through a cutout 36. The width of the cutout 36 is a little larger than the neck portion $29a_1$ of the spherical end 29a. After the neck portions $29a_1$ of the pump plungers 27 have been fitted in the plunger retaining holes 34 through the cutouts 36, the pump plungers 27 are inserted respectively into the pump cylinder bores 25 and the retainer plate 32 is attached to the first swash plate assembly 9, whereby the neck portions $29a_1$ can be prevented from coming off the cutouts 36, and moreover, the spherical ends 29a can be held in their engaged positions with the spherical recesses 29b by the plunger retaining holes 34. Thus, with the relative rotation of the pump swash plate 9a and the cylinder block 4, the pump plungers 27 can be reciprocated forcibly, so it is not necessary to use a return spring for urging the pump plungers 27 in their projecting direction.

The valve retaining holes 35 are each formed smaller in diameter than the spherical end 30a of each of the first distributing valves 28 and larger in diameter than a neck portion $30a_1$ of the spherical end 30a, and are each opened to the inner periphery of the retainer plate 32 through a cutout 37. The width of the cutout 37 is a little larger than the neck portion $30a_1$ of the spherical end 30a. Therefore, by the same assembling method as is the case with the pump plungers 27, the neck portions $30a_1$ can be prevented from coming off the cutouts 37 and the spherical ends 30a can be held in their engaged positions with the spherical recesses 30b, so that the first distributing valves 28 can be reciprocated forcibly with the relative rotation of the first valve swash plate 9b and the cylinder block 4.

Referring again to FIGS. 1 and 2, in the cylinder block 4, motor cylinder bores 39 are formed in the same number as the pump cylinder bores 25 and annularly and alternately with the pump cylinder bores 25 on the first pitch circle $C_1$ of the group of the pump cylinder bores 25. Likewise, second valve holes 40 are formed in the same number as the motor cylinder bores 39 and annularly and alternately with the first distributing valves 28 on the second pitch circle $C_2$ of the group of the first valve holes 26. One ends of the motor cylinder bores 39 are open to the right end surface of the cylinder block 4, while the opposite ends thereof are closed. The second valve holes 40 are formed smaller in diameter than the motor cylinder bores 39 and extend axially through the cylinder block 4. In the illustrated embodiment, the pump cylinder bores 25 and the motor cylinder bores 39 are of the same diameter and so are the first and second valve holes 26, 40. Thus, the second valve holes 40 are smaller in diameter than the motor cylinder bores 39.

Motor plungers 41 and spool type second distributing valves 42 are slidably fitted in the motor cylinder bores 39 and the second valve holes 40, respectively. Front ends of the motor plungers 41 and the second distributing valves 42 are projected from the right end surface of the cylinder block 4 into abutment with the motor swash plate 19a and the second valve swash plate 19b, respectively. While the cylinder block 4 rotates, the motor swash plate 19a and the second valve swash plate 19b impart axial reciprocating motions to the motor plunger 41 and the second distributing valves 42, respectively, and a swash plate type hydraulic motor M (a swash plate type hydraulic unit) is formed by them.

The front ends of the motor plungers 41 and the second distributing valves 42 are formed as spherical ends 43a and 44a, respectively, and spherical recesses 43b and 44b for engagement with and larger in diameter than the spherical ends 43a and 44a are formed in the motor swash plate 19a and the second valve swash plate 19b, respectively, whereby the slippage in the rotational direction between the motor swash plate 19a and the motor plungers 41 and that between the second valve swash plate 19b and the second distributing valves 42 are prevented, and moreover, bending moments exerted on the motor plungers 41 and the second distributing valves 42 from the respective associated swash plates 19a and 19b can be diminished.

An annular retainer plate 45 for holding the spherical ends 43a and 44a of the motor plungers 41 and the second distributing valves 42 in an engaged state with the corresponding spherical recesses 43b and 44b of the swash plates 19a and 19b is attached to the second swash plate assembly 19 rotatably with a cir-clip 46. The structure of connection of the retainer plate 45 with the motor plungers 41 and the second distributing valves 42 is the same as the structure of connection of the retainer plate 32 with the pump plunger 27 and the first distributing valve 28.

In the cylinder block 4, annular high-pressure oil path 47 and low-pressure oil path 48, which intersect both the first and second valve holes 26, 40, are formed in an axially spaced manner. Further formed in the cylinder block 4 are a large number of pump ports 25a extending respectively from the pump cylinder bores 25 and reaching the first valve holes 26 located at positions out of phase by 90° in the direction opposite to the rotational direction of the cylinder block 4 (the arrow R in FIG. 2 indicates the rotational direction of the cylinder block 4), as well as a large number of motor ports 39a extending respectively from the motor cylinder bores 39 and reaching the second valve holes 40 located at positions out of phase by 90° in the direction opposite to the rotational direction of the cylinder block 4.

Figure 9:
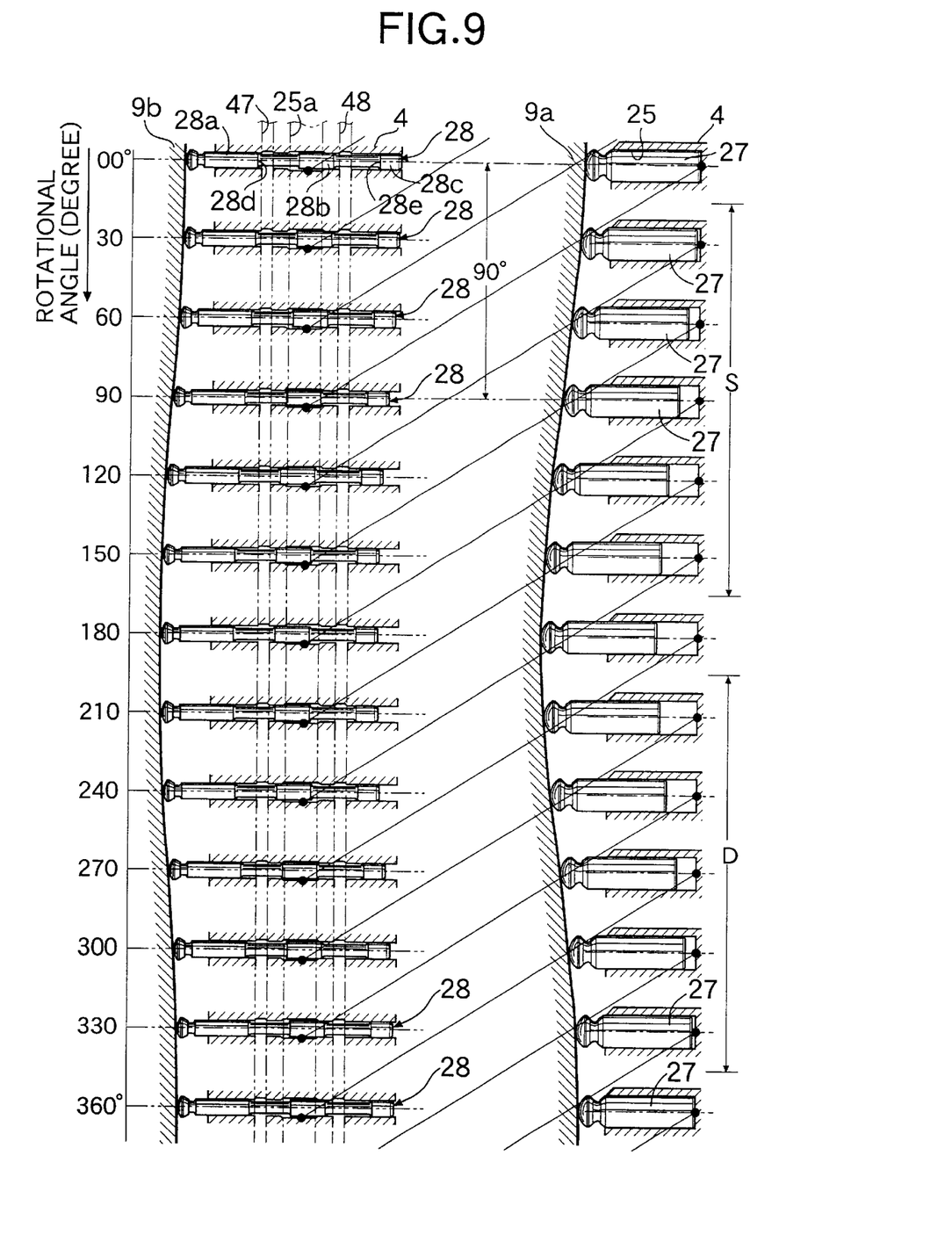
FIG. 9 is an operation timing diagram of a pump plunger and a first distributing valve.

As shown in FIG. 9, each of the first distributing valves 28 is provided successively from its spherical end 30a side with a first land portion 28a, a first annular groove 28d, a second land portion 28b, a second annular groove 28e and a third land portion 28c. When the first distributing valve 28 is at its rightmost limit of movement by the first valve swash plate 9b, the first annular groove 28d provides communication between the associated pump port 25a and the high-pressure oil path 47, and the second land portion 28b cuts off communication between the pump port 25a and the low-pressure oil path 48. On the other hand, at the leftmost limit of movement of the first distributing valve 28, the second annular groove 28e provides communication between the associated pump port 25a and the low-pressure oil path 48, and the second land portion 28b cuts off communication between the pump port 25a and the high-pressure oil path 47. Further, at the mid-point of its stroke, the first and second land portions 28a, 28b isolate the pump port 25a from both oil paths 47 and 48.

Figure 10:
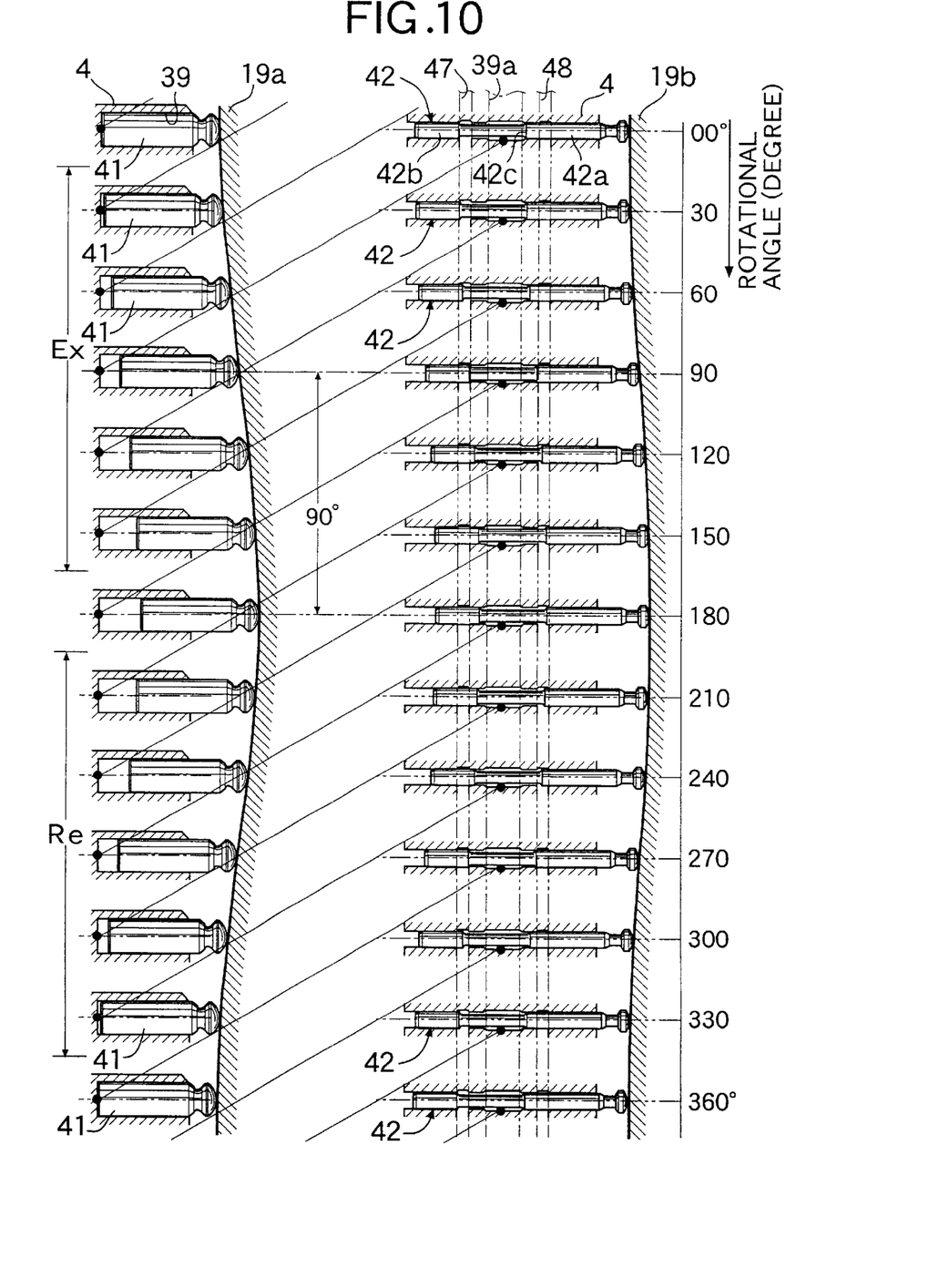
FIG. 10 is an operation timing diagram of a motor plunger and a second distributing valve.

On the other hand, as shown in FIG. 10, each of the second distributing valves 42 is provided successively from its spherical end 44a side with a first land portion 42a, an annular groove 42c and a second land portion 42b. At the leftmost limit of movement of the second distributing valve 42 by the second valve swash plate 19b, the annular groove 42c provides communication between the associated motor port 39a and the low-pressure oil path 48, and the second land portion 42b cuts off communication between the motor port 39a and the high-pressure oil path 47. On the other hand, at its rightmost limit of movement, the annular groove 42c provides communication between the motor port 39a and the high-pressure oil path 47, and the first land portion 42a cuts off communication between the motor port 39a and the low-pressure oil path 48. Further, at the mid-point of its stroke, the first and second land portions 42a, 42b isolate the motor port 39a from both the oil paths 47 and 48.

As shown in FIG. 1, a replenishing oil path 50 is formed centrally of the output shaft 2, the oil path 50 being connected to a discharge side of a replenishing pump 49 which is driven by an engine (not shown). Further, a first communication hole 51 and a second communication hole 52 are formed in the output shaft 2 to provide communication between the replenishing oil path 50 and the low- and high-pressure oil paths 48, 47, and a first check valve 53 and a second check valve 54 are mounted in the first and second communication holes 51, 52, respectively. The first check valve 53 permits the flow of oil in only one direction from the replenishing oil path 50 to the low-pressure oil path 48, while the second check valve 54 permits the flow of oil in only one direction from the replenishing oil path 50 to the high-pressure oil path 47.

Figure 3:
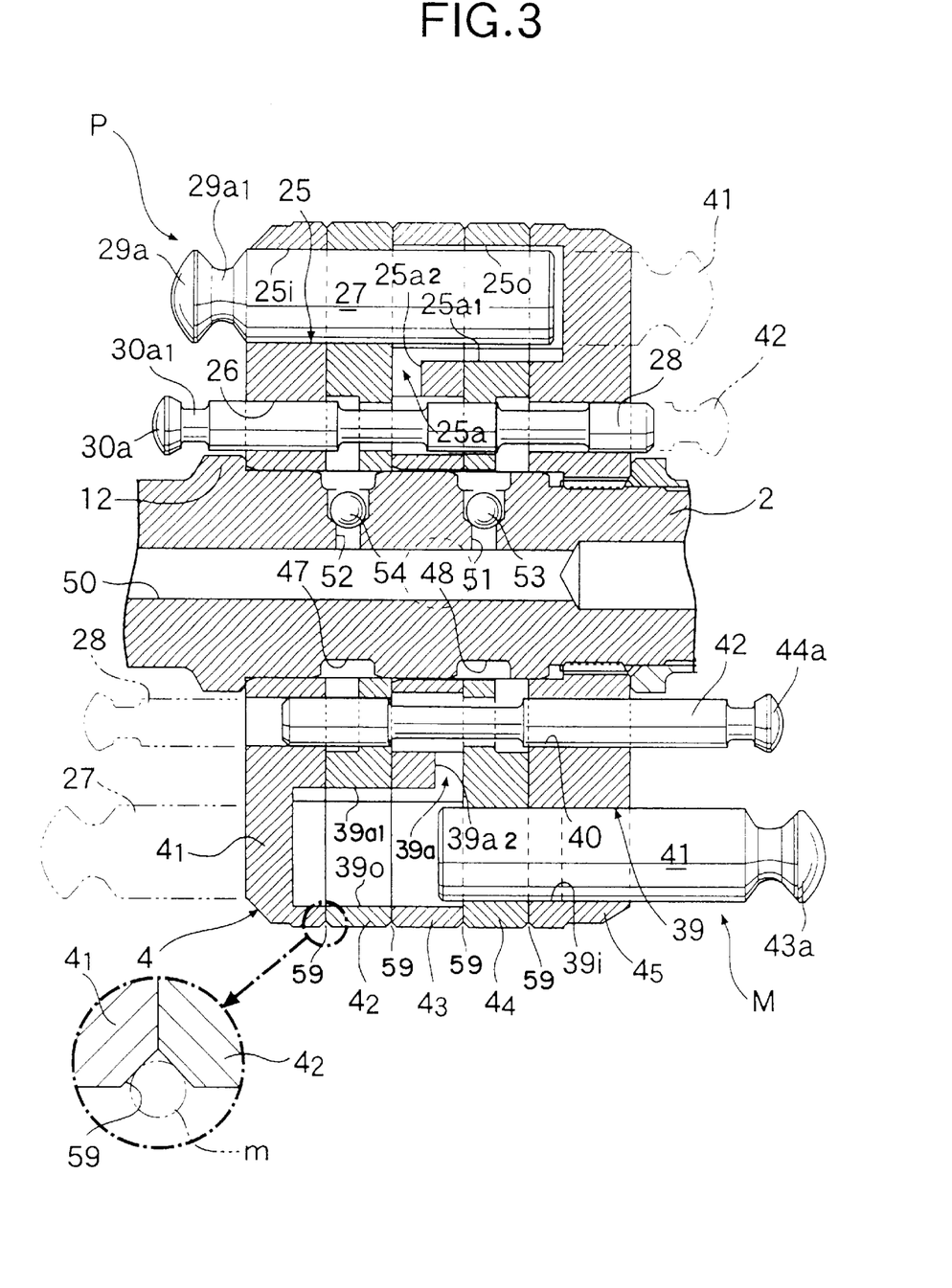
FIG. 3 is an enlarged view of principal portions in FIG. 1.
Figure 4:
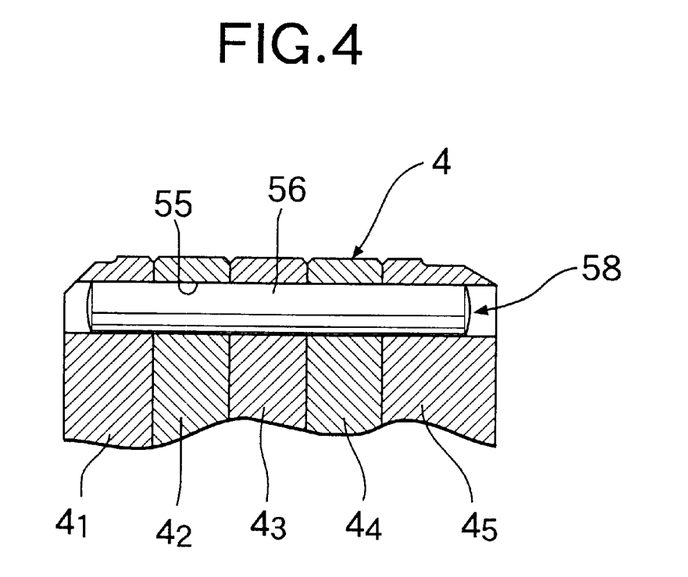
FIG. 4 is a sectional view taken on line 4—4 in FIG. 2.
Figure 8:
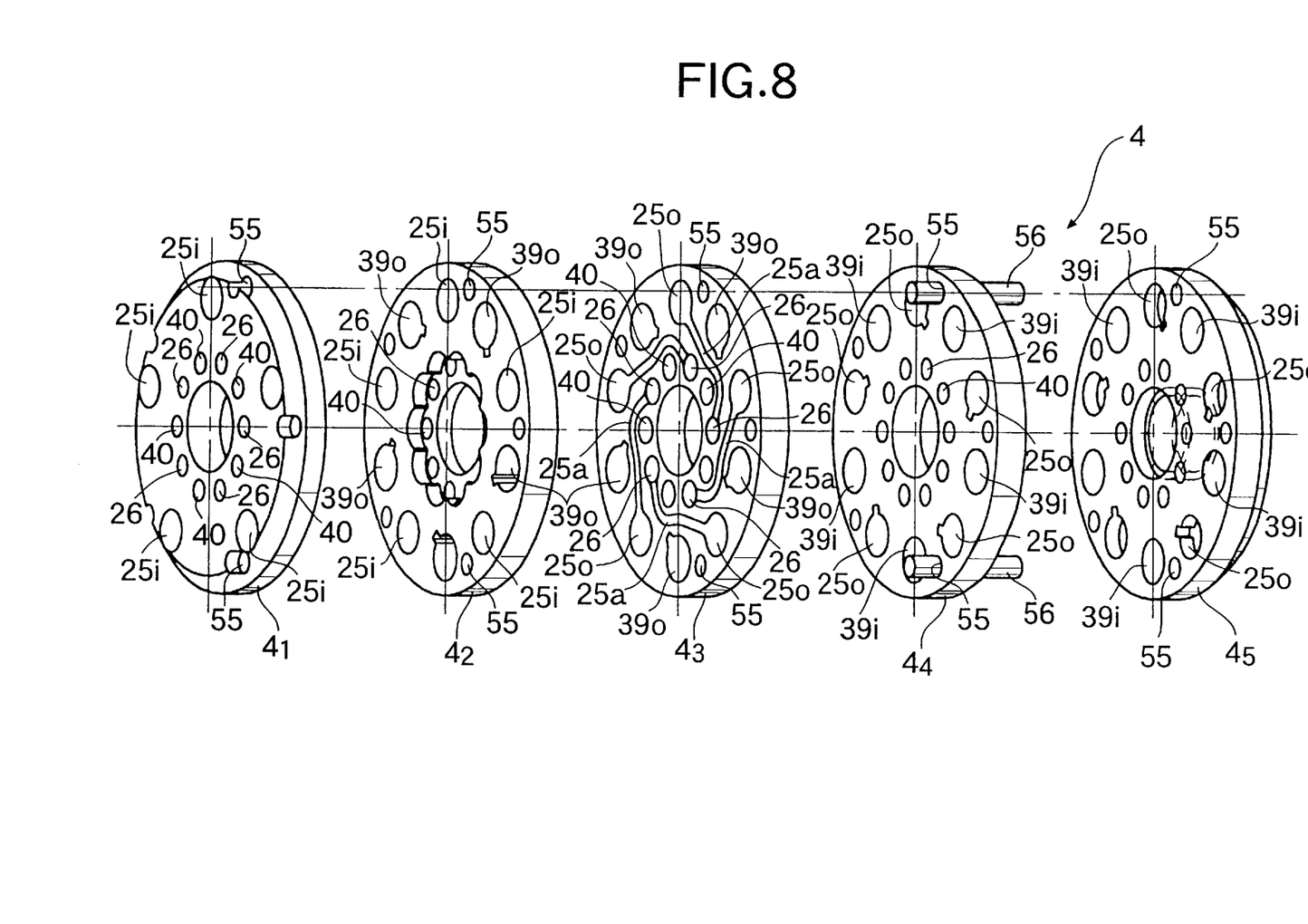
FIG. 8 is an exploded perspective view of a cylinder block.

As shown in FIGS. 3, 4 and 8, the cylinder block 4 is formed by a plurality (five in the illustrated embodiment) of block plates $4_1$, to $4_5$ being divided at split planes extending orthogonal to the cylinder block axis X, which block plates are combined together. The block plates $4_1$ to $4_5$ are formed by press working and hence they have each a thickness suitable for press working. As to the structure for combining the block plates $4_1$ to $4_5$, it will be described later.

The five block plates will hereinafter be referred to as the first block plate $4_1$ to the fifth block plate $4_5$ successively from the left-hand side in FIG. 3. The pump cylinder bores 25, motor cylinder bores 39, first valve holes 26 and second valve holes 40 are formed through the first block plate $4_1$ to the fifth block plate $4_5$. In this case, each of the pump cylinder bores 25, in order to support the associated pump plunger 27 slidably therein, comprises an inlet hole 25i formed through the first and second block plates $4_1$, $4_2$ and an inner hole 25o somewhat larger in diameter than the inlet hole 25i, the inner hole 25o being formed through the third block plate $4_3$ to the fifth block plate $4_5$ so as to define an oil chamber between the block plates and the inner end surface and outer peripheral surface of the pump plunger 27. Likewise, each of the motor cylinder bores 39, in order to support the associated motor plunger 41 slidably therein, comprises an inlet hole 39i formed through the fourth and fifth block plates $4_4$, $4_5$ and an inner hole 39o somewhat larger in diameter than the inlet hole 39i, the inner hole 39o being formed through the first to third block plates $4_1$ to $4_3$ so as to define an oil chamber between the block plates and the inner end surface and outer peripheral surface of the motor plunger 41.

Each of the pump ports 25a comprises an axial groove $25a_1$ formed in the inner peripheral surface of the inner hole 25o in the associated pump cylinder bore 25 and a curved groove 25a2 formed in the split plane of the third block plate $4_3$ located on the second block plate $4_2$ side, the curved groove $25a_2$ reaching the first valve hole 26 located at a position shifted by 90° from the inner hole 25o, as noted previously. Likewise, each of the motor ports 39a comprises an axial groove $39a_1$ formed in the inner peripheral surface of the inner hole 39o of the associated motor cylinder bore 39 and a curved groove $39a_2$ formed in the split plane of the third block plate $4_3$ located on the fourth block plate $4_4$ side, the curved groove $39a_2$ reaching the second valve hole 40 located at a position shifted by 90° from the inner hole 39o, as noted above.

The high-pressure oil path 47 is formed between the fitting surfaces of the second block plate $4_2$ and the output shaft 2, while the low-pressure oil path 48 is formed between the fitting surfaces of the fourth block plate $4_4$ and the output shaft 2.

At least two (five in the illustrated embodiment) positioning holes 55 are formed through the first block plate $4_1$ to the fifth block plate $4_5$ at even intervals around the cylinder block axis X, and positioning pins 56 are inserted into the positioning holes 55, thereby bringing the pump cylinder bores 25, motor cylinder bores 39, first valve holes 26 and second valves holes 40 in the block plates $4_1$ to $4_5$ into alignment respectively on straight lines. The positioning holes 55 and the positioning pins 56 form positioning means 58.

The outer peripheral edges of the first to the fifth block plates $4_1$ to $4_5$ are chamfered so that when the first to the fifth block plates $4_1$ to $4_5$ are superimposed together, there are formed annular grooves 59 on their outer peripheries which grooves face the split planes, respectively.

In bonding together the first to the fifth block plates $4_1$ to $4_5$ thus superimposed one another under positioning with the positioning pins 56, linear solder materials mare annularly wound respectively around the annular grooves 59 and are then heat-melted while the first to the fifth block plates $4_1$ to $4_5$ are brought into pressure contact with one another, resulting in that the thus-melted solder materials get into not only between the split planes of the block plates $4_1$ to $4_5$ but also between the positioning pins 56 and the positioning holes 55 under a capillary phenomenon. Their subsequent solidification permits the block plates to be bonded together. In this way the block plates $4_1$ to $4_5$ are bonded not only to one another but also to the positioning pins 56, so that the positioning pins 56 fulfill the function of a connection member and hence a strong bonding force can be created. Moreover, since the first to the fifth block plates $4_1$ to $4_5$ are brought into pressure contact with one another, the clearance between adjacent block plates becomes extremely fine and thus the permeation of the solder materials to various portions under the capillary phenomenon can be improved.

Further, when the solder materials m thus fed into the annular grooves 59 are melted, they are prevented by those annular grooves from flowing out to any other portion than the portions to be soldered, and thus the yield of the solder materials m, which are expensive, is very high.

Figure 5:
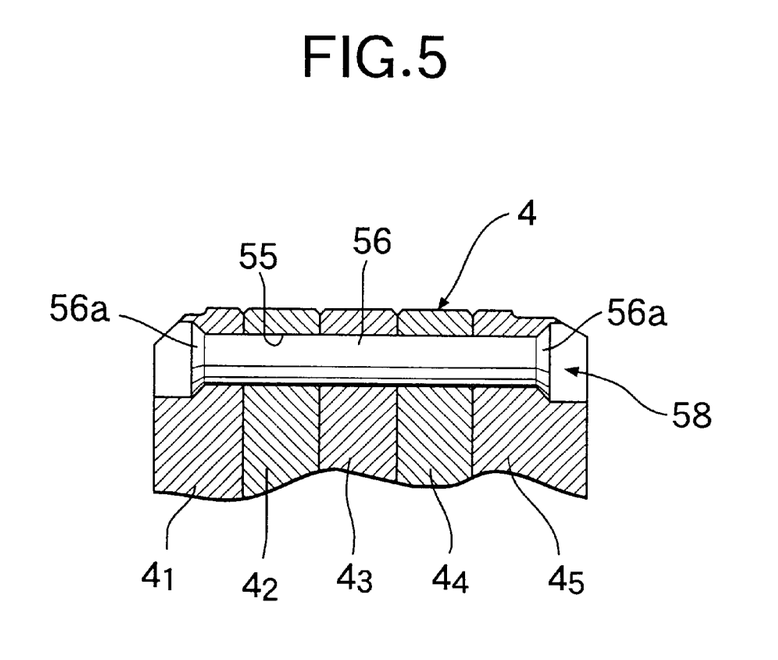
FIG. 5 is a sectional view showing a modification of FIG. 4.

As shown in FIG. 5, prior to the above soldering work, both ends 56a, 56a of each of the positioning pins 56 may be caulked so that the first to the fifth block plates $4_1$ to $4_5$ are pressed against one another and so that the pin 56 is prevented from coming off the associated positioning hole 55. This is effective in attaining a satisfactory soldered state without the use of any special jig for maintaining the laminated state of the block plates.

The operation of this embodiment will be described below.

If the first swash plate assembly 9 is rotated through the input gear 5a with the power of the engine (not shown) while holding the motor swash plate 19a at a certain angle of inclination, then, as noted previously, axial reciprocating motions can be imparted to the pump plungers 27 and the first distributing valves 28 forcibly and at good timing by cooperation of the pump swash plate 9a and the first valve swash plate 9b with the retainer plate 32. Thus, their proper reciprocating motions are ensured even in a high-speed operation.

As shown in FIG. 9, while the pump plungers 27 pass through a suction area S in which the oil chambers defined in the pump cylinder bores 25 are expanded, the first distributing valves 28 bring the pump ports 25a into communication with the low-pressure oil path 48, so that the hydraulic oil present in the low-pressure oil path 48 is sucked into the oil chambers in the pump cylinder bores 25. On the other hand, while the pump plungers 27 pass through a discharge area D in which the oil chambers defined in the pump cylinder bores 25 are contracted, the first distributing valves 28 bring the pump ports 25a into communication with the high-pressure oil path 47, so that the hydraulic oil of high pressure present in the pump cylinder bores 25 is discharged to the high-pressure oil path 47.

On the other hand, in the hydraulic motor M, as shown in FIG. 10, while the motor plungers 41 are present in an expansion area Ex in which the oil chambers defined in the motor cylinder bores 39 are expanded, the second distributing valves 42 bring the motor ports 39a into communication with the high-pressure oil path 47, and while the motor plungers 41 are present in a contraction area Re in which the oil chambers defined in the motor cylinder bores 39 are contracted, the second distributing valves 42 bring the motor ports 39a into communication with the low-pressure oil path 48, so that the hydraulic oil of high pressure which has been discharged from the pump cylinder bores 25 to the high-pressure oil path 47 as mentioned above is fed to the cylinder bores 39 of the motor plungers 41 located in the expansion area Ex, thereby imparting thrust to the motor plungers 41. The motor plungers 41 located in the contraction area Re discharge the hydraulic oil from the motor cylinder bores 39 to the low-pressure oil path 48 as the contraction stroke proceeds. The motor plungers 41 thus thrusted by the hydraulic oil of high pressure present in the motor cylinder bores 39 push the motor swash plate 19a and impart a rotational torque thereto, then with the resulting reaction torque, the cylinder block 4 rotates in the same direction as the input gear 5a and this rotational torque is transmitted to an external load from the output shaft 2. Also in this case, reciprocating motions of the motor plungers $4_1$ and the second distributing valves 42 are performed forcibly and at good timing by cooperation of the motor swash plate 19a and the second valve swash plate 19b with the retainer plate 45.

In such a normal operation, if the pressure of the low-pressure oil path 48 is reduced due to the leakage of hydraulic pressure from various portions of the cylinder block 4, the first check valve 53 opens and the hydraulic oil is replenished to the low-pressure oil path 48 from the replenishing oil path 50. When engine brake is applied, the pressure of the high-pressure oil path 47 becomes low and that of the low-pressure oil path 48 becomes high, therefore, the replenishment for the leakage of hydraulic pressure at this time is performed through the second check valve 54.

The hydraulic pump P is a fixed displacement type with the inclination angle of the pump swash plate 9a being fixed, whereas the hydraulic motor M is a variable displacement type with the inclination angle of the motor swash plate 19a being variable, so that the change gear ratio between the input member 5 and the output shaft 2 can be changed by changing the inclination angle of the motor swash plate 19a to increase or decrease the capacity of the hydraulic motor M. More specifically, by changing the position of the motor swash plate 19a from its maximum tilted position (most tilted from the plane perpendicular to the cylinder block axis X) at which the capacity of the hydraulic motor M is maximized, to its upright position (the position perpendicular to the cylinder block axis X) at which the motor capacity is made zero, it is possible to control the change gear ratio from a low ratio up to the top ratio of 1.

Figure 11:
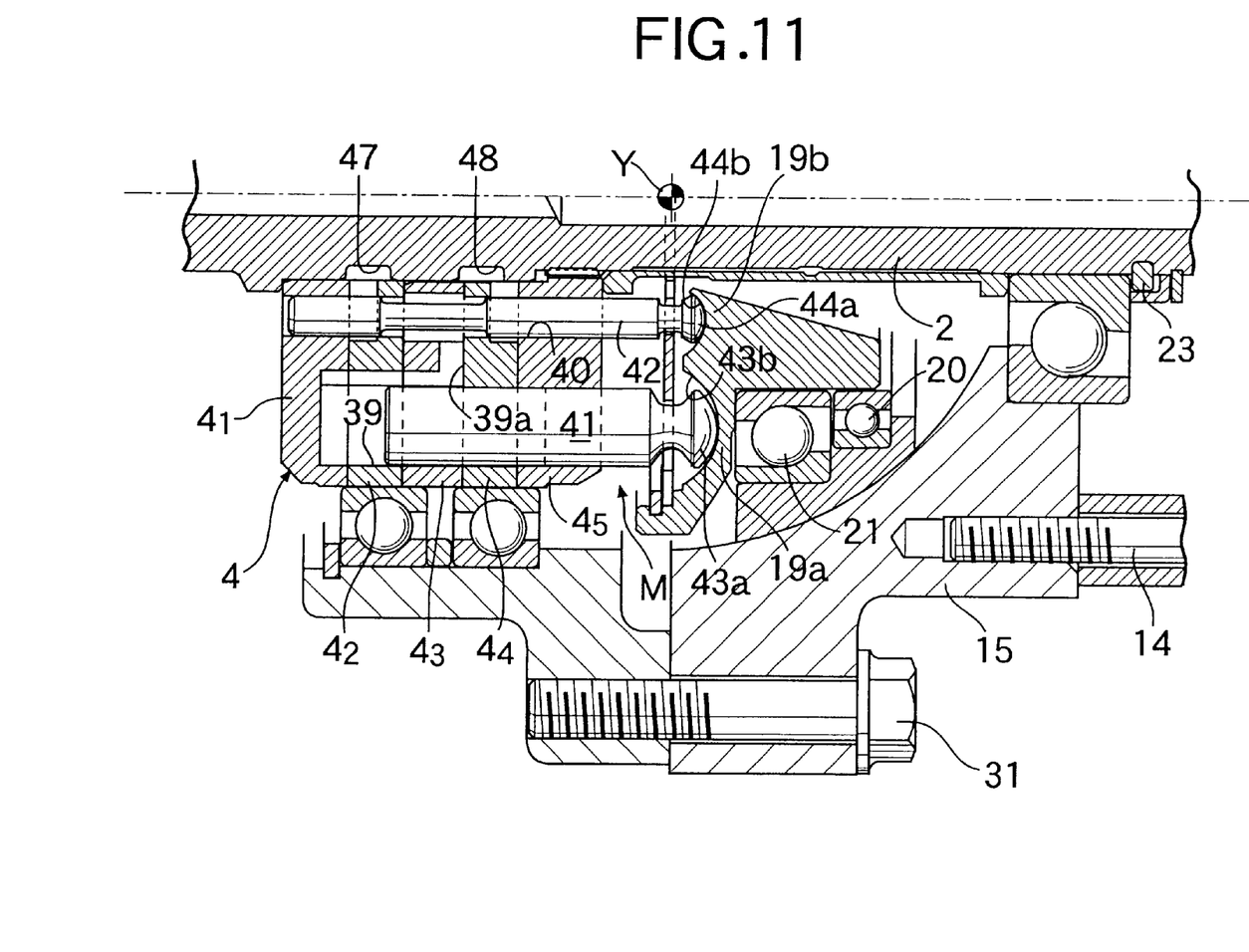
FIG. 11 is an operation explaining diagram in an upright state of a motor swash plate.

Besides, since the motor swash plate 19a, together with the second valve swash plate 19b disposed on the same slant plane as the motor swash plate, form the second swash plate assembly 19, the second valve swash plate 19b displaces itself together with the motor swash plate 19a. It follows that when the motor swash plate 19a reaches its upright position, the second valve swash plate 19b also stands upright. In the upright state of the second valve swash plate 19b, as shown in FIG. 11, the second distributing valves 42 are held at their stroke mid-points to keep the motor ports 39a cut off from both the high- and low-pressure oil paths 47, 48, thus resulting in the so-called lock-up state in which the oil path for communication between the hydraulic pump P and the hydraulic motor M is cut off.

Consequently, the volume of the oil path communicating with the hydraulic pump P is reduced to half and the incompressibility of the hydraulic oil present in the oil path is improved (this is due to the decrease of the oil path volume and consequent reduction by half of the total quantity of air bubbles contained in the hydraulic oil). Besides, since the leakage of oil in the hydraulic motor M no longer exerts any influence on the hydraulic transfer efficiency, whereby the relative rotation between the input member 5 and the output shaft 2 can be kept to a minimum and hence it is possible to enhance the hydraulic transfer efficiency in the state of top ratio. Additionally, since it is the second valve swash plate 19b integral with the motor swash plate 19a that actuates the second distributing valves 42 in the above manner, it is not necessary to use a dedicated interlocking mechanism for operating the second valve swash plate 19b, thus contributing to the simplification of structure.

In the continuously variable transmission T of the above construction, the annular high-pressure oil path 47 and low-pressure oil path 48 are formed side by side in the axial direction of the cylinder block 4, and a large number of the first and second distributing valves 28, 42 are slidably fitted respectively in a large number of the first and second valve holes 26, 40 which are formed in the cylinder block 4 so as to extend in parallel with the cylinder block axis X while intersecting both the oil paths 47 and 48. Consequently, all of the pump cylinder bores, motor cylinder bores and first and second valve holes 26, 40 are parallel to the cylinder block axis X and hence can be machined in the cylinder block 4 easily and quickly with a parallel multi-spindle tool. Besides, since the first and second valve swash plates 9b, 19b, which actuate the first and second distributing valves 28, 42, respectively, with their relative rotation with respect to the cylinder block 4, are disposed on both end sides of the cylinder block, like the pump and motor swash plates 9a, 19a, the number of components disposed on the outer periphery of the cylinder block 4 becomes small, thus greatly contributing to the reduction in radial size of the continuous variable transmission.

In the cylinder block 4, moreover, since the pump plungers 27 and the motor plungers $4_1$ are arranged on the first pitch circle $C_1$ and the first and second distributing valves 28, 42 smaller in diameter than the plungers 27 and 41 are arranged on the second pitch circle $C_2$ of a diameter smaller than that of the first pitch circle $C_1$, the distributing valves 28 and 42 are disposed in the dead space formed radially inside the plungers 27 and 41, so that even if the first pitch circle $C_1$ is set at a sufficiently large size to ensure sufficient reciprocating strokes to be given to the plungers 17 and 41 by the swash plates 9a and 19a, the presence of the distributing valves 28 and 42 does not lead to an increase in size of the cylinder block 4, thus permitting the reduction in radial size of the continuously variable transmission T. Besides, since the distributing valves 28 and 42 are formed smaller in diameter than the plungers 27 and 41, the distributing valves 28 and 42 can be easily disposed even inside the plungers 27 and 41.

Further, since the pump plungers 27 and the motor plungers 41 are arranged alternately on the same first pitch circle $C_1$, it is possible to decrease the axial size of the cylinder block 4 without increase its entire size, whereby the continuously variable transmission T can be reduced its size in both radial and axial directions.

Further, since the high-pressure oil path 47 and the low-pressure oil path 48 are disposed inside the group of both the pump plungers 27 and motor plungers 41, it is possible to minimize the lengths of both the high- and low-pressure oil paths 47, 48, whereby the absolute quantity of air bubbles present in the hydraulic oil in those oil paths can be decreased and the hydraulic transfer efficiency can thereby be improved.

Further, since the pump swash plate 9a and the first valve swash plate 9b, which are disposed on the same slant plane, are formed integrally with the first swash plate assembly 9 and the motor swash plate 19a and the second valve swash plate 19b, which are disposed on the same slant plane, are formed integrally with the second swash plate assembly 19, it is possible to prevent an increase in axial size of the continuously variable transmission T caused by the presence of plural swash plates.

Besides, the pump swash plate 9a and the first swash plate 9b can be machined at a time to the first swash plate assembly 9 and so can be done the motor swash plate 19a and the second valve swash plate 19b to the second swash plate assembly 19, thus ensuring a high mass-productivity.

The distributing valves 28 and 42, at the mid-points of their reciprocating strokes, cause the ports 25a and 39a to be cut off from both low- and high-pressure oil paths 48 and 47. In this connection, the pump ports 25a of the pump cylinder bores 25 are connected to the first valve holes 26 which are 90° out of phase in the direction opposite to the rotational direction of the cylinder block 4, and the motor ports 39a of the motor cylinder bores 39 are connected to the second valve holes 40 which are 90° out of phase in the direction opposite to the rotational direction of the cylinder block 4. Therefore, even if the pump swash plate 9a and the first valve swash plate 9b, as well as the motor swash plate 19a and the second valve swash plate 19b, are in the same inclined arrangement, when the plungers 27 and 41 reach their advance or retreat motion limit, the corresponding ports 25a and 39a come to be shut off from both low- and high-pressure oil paths 48, 47. Therefore, when the plungers 27 and 41 subsequently change their motion to retreat or advance motion, it is possible to switch over the ports 25a and 39a accurately into communication with the low-pressure oil path 48 or the high-pressure oil path 47.

Further, the cylinder block 4 is formed by soldering together the first to fifth block plates $4_1$ to $4_5$ which have been formed by pressing block plates being divided at split planes extending orthogonal to the axis X of the cylinder block. In this case, the inlet hole 25i corresponding to an inlet-side half of each pump cylinder bore 25 is formed in the first and second block plates $4_1$, $4_2$, and the inner hole 25o corresponding to an inner-side half of the pump cylinder bore and larger in diameter than the inlet hole 25i is formed in the third to fifth block plates $4_3$ to $4_5$. Likewise, the inlet hole 39i corresponding to an inlet-side half of each motor cylinder bore 39 is formed in the fourth and fifth block plates $4_4$, $4_5$, and the inner hole 39o corresponding to an inner-side half of the motor cylinder bore and larger in diameter than the inlet hole 39i is formed in the first to third block plates $4_1$ to $4_3$. Thus, the large number of inlet holes 25i, 39i or inner holes 25o, 39o formed in the block plates $4_1$ to $4_5$ are relatively shallow and mass production by press working of the block plates $4_1$ to $4_5$ having such many holes can be done easily. Therefore, by bonding the block plates $4_1$ to $4_5$ with one another while positioning them with the positioning means 58, the cylinder block 4 can be manufactured efficiently.

Besides, even if there is a slight error in machining or assembly, such an error can be absorbed by the difference in diameter between the inlet holes 25i, 39i and the inner holes 25o, 39o of a diameter larger than that of the inlet holes 25i, 39i, so there is no obstacle to the sliding motion of the plungers 27, 41 and a further improvement of mass productivity can be attained by roughening the machining accuracy of the inner holes 25o, 39o.

In each of the inner holes 25o, 29o, moreover, since there is formed an oil chamber to which not only the inner end surface but also the outer peripheral surface of each of the associated plungers 27, 41 face, the sliding surface of each of the plungers 27, 41 is always lubricated satisfactorily by the hydraulic oil present in the oil chamber, whereby a smooth operation of the plunger can be ensured.

The curved grooves $25a_2$, $39a_2$ of the pump ports 25a and the motor ports 39a are relatively complicated in shape, but since those curved grooves are formed in the split plane of the third block plate $_{43}$, they can be formed simultaneously with the press working for the third block plate $4_3$.

Figure 12:
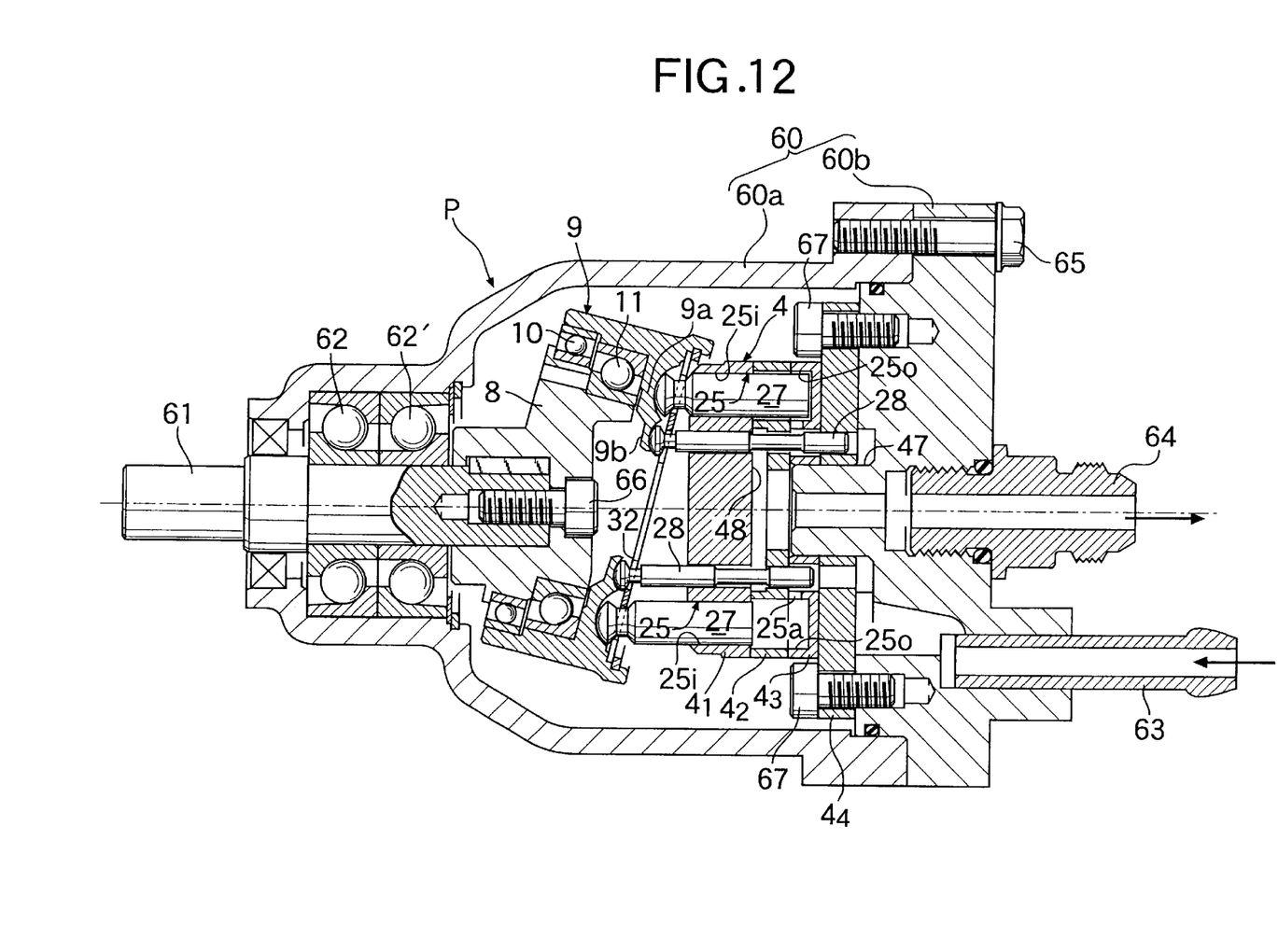
FIG. 12 is a side view in longitudinal section of a hydraulic pump according to the second embodiment of the present invention.

FIG. 12 illustrates the second embodiment of the present invention in which the invention is applied to only the swash plate type hydraulic pump P. A pump case 60, which is supported by a suitable fixed structure, comprises a cupshaped case body 60a and a cover 60b which is secured to an open end of the case body with bolt 65. An input shaft 61, which is driven by an engine (not shown), is supported in an end wall of the case body 60a through a pair of angular contact bearings 62, 62'. A suction pipe 63 and a discharge pipe 64 are attached to the cover 60b. The suction pipe 63 is connected to an oil sump or a low-pressure oil path (not shown), while the discharge pipe 64 is connected to a hydraulic device (not shown) serving as a load.

Within the pump case 60, a swash plate holder 8 is fixed to the input shaft 61 with bolt 66, and on the outer periphery of the swash plate holder 8 is supported a swash plate assembly 9 rotatably through a ball bearing 10 and an angular contact bearing 11. As is the case with the first swash plate assembly 9 used in the previous embodiment, the swash plate assembly 9 used in this second embodiment is also integrally provided with a pump swash plate 9a and a valve swash plate 9b which are disposed on the same slant plane. A cylinder block 4 is fixed to the cover 60b with bolts 67 so as to be coaxial with the input shaft 60.

In the cylinder block 4, like the layout of the hydraulic pump P used in the previous embodiment, a large odd-number (five in the illustrated embodiment being considered) of pump cylinder bores 25 and valve holes 26, pump ports 25a connected to the pump cylinder bores 25, and an annular low-pressure oil path 48, are formed and pump plungers 27 and distributing valves 28 are fitted in the pump cylinder bores 25 and valve holes 26, respectively. An annular high-pressure oil path 47 is formed between the joint surfaces of the cylinder block 4 and the cover 60b. The low-pressure oil path 48 and the high-pressure oil path 47 are in communication with the suction pipe 63 and the discharge pipe 64, respectively.

Spherical ends 29a and 30a of the pump plungers 27 and distributing valves 28 are kept engaged with spherical recesses 29b and 30b of the pump swash plate 9a and the valve swash plate 9b, respectively, by a retainer plate 32 having the same structure as in the previous embodiment.

In this case, the cylinder block 4 is divided axially into four block plates $4_1$ to $4_4$, which are positioned with respect to one another and are soldered in the same way as in the previous embodiment. The first block plate 41 which faces the swash plate assembly 9 is thicker than the other block plates, and the pump cylinder bores 25, i.e., inlet holes 25i, formed therein are finished with a high accuracy to support the pump plungers 27 slidably. On the other hand, the pump cylinder bores 25, i.e., inner holes 25o, formed in the second and third block plates $4_2$, $4_3$ are finished rough and to a somewhat larger size than those formed in the first block plate $4_1$. The low-pressure oil path 48 is formed in the second block plate $4_2$, and the pump ports 25a are formed in groove shapes in the split plane of the third block plate $4_3$. The fourth block plate $4_4$ is larger in diameter than the other block plates and its outer peripheral portion is fixed to the cover 60b with bolts 67. With this construction, it becomes possible to thin particularly the second to fourth block plates $4_2$ to $4_4$ and hence possible to effect press working for them easily.

Other constructional points are the same as in the hydraulic pump P described in the previous embodiment, and in the drawings, the portions corresponding to portions of the hydraulic pump P in the previous embodiment are identified by like reference numerals and explanations thereof will be omitted here.

The present invention is not limited to the above embodiments, but various design modifications may be made within the scope not departing from the gist of the invention. For example, the thickness of each constituent block plate of the cylinder block may be set at a value which permits precision casting, forging, or sintering.

What is claimed is:

1. A swash plate type hydraulic unit comprising:

a cylinder block (4) having a multitude of cylinder bores (25, 39) arranged annularly in parallel with a cylinder block axis (X) on a pitch circle ($C_1$) which surrounds said axis (X), a multitude of plungers (27, 41) slidably fitted respectively in the cylinder bores (25, 39), and a plunger swash plate (9a, 19a) for rotating relatively with respect to the cylinder block (25, 39), thereby causing the plungers (27, 41) to reciprocate, characterized in that:

said cylinder block (4) is formed by combining a plurality of block plates ($4_1$ to $4_5$) with one another, said block plates being divided at split planes extending orthogonal to the cylinder block axis (X);

said cylinder bores (25, 39) are comprised of inlet holes (25i, 39i) for supporting corresponding said plungers (27, 41) slidably and inner holes (25o, 39o) of a diameter larger than that of said inlet holes (25i, 39i), said inlet holes (25i, 39i) being formed in an inlet-side one of said block plates ($4_1$, $4_2$; $4_4$, $4_5$) positioned on a side which faces the plunger swash plate (9a, 19a), said inner holes (25o, 39o) being formed in remaining inner-side ones of said block plates ($4_3$ to $4_5$; $4_1$ to $4_3$) to each define an oil chamber between said inner hole and the outer peripheral surface and end surface of the corresponding plunger (27, 41);

said cylinder block (4) has positioning means (58) for coaxially arranging the cylinder bores (25, 39) in the block plates ($4_1$ to $4_5$);

said cylinder block (4) is provided with a plurality of valve holes (26, 40) having distributing valves (28, 42) mounted therein; and ports (25i, 39i) of the respective cylinder bores (4) are formed in groove shapes in the split plane of a part ($4_3$) of the block plates so as to be controlled selectively by said distributing valves (28, 42).

2. A swash plate type hydraulic unit according to claim 1, wherein a multitude of valve holes (26, 40) are formed through the plural block plates ($4_1$ to $4_5$) annularly in parallel with said axis (X) on a pitch circle ($C_2$) separate from and concentric with said pitch circle ($C_1$), spool type distributing valves (28, 42) are slidably fitted in said valve holes (26, 40), a valve swash plate (9b, 19b) is arranged to reciprocate relatively with respect to the cylinder block (4), thereby causing the distributing valves (28, 42) to reciprocate, and said valve swash plate (9b, 19b) and said plunger swash plate (9a, 19a) are disposed on the same slant plane and are formed integrally with each other to form a swash plate assembly (9, 19), and ports (25a, 39a) of the respective cylinder bores (25, 39) are disposed by the distributing valves (28, 42) at positions out of phase by 90° in the circumferential direction of the cylinder block (4) with respect to the cylinder bores (25, 39).

3. A swash plate type hydraulic unit according to claim 1 or 2, wherein positioning pins (56) are inserted into a series of positioning holes (55) formed axially in all of the block plates ($4_1$ to $4_5$), thereby forming said positioning means (58), the block plates ($4_1$ to $4_5$) are bonded together with solder, and the block plates ($4_1$ to $4_5$) and the positioning pins (56) are also bonded together with solder.

4. A swash plate type hydraulic unit according to claim 3, wherein the plural block plates (4₁ to 4₅) are axially superimposed together, and annular grooves (59) capable of holding a solder material (m) therein are formed in the outer peripheries of the block plates so as to face the split planes of the block plates.

5. A swash plate type hydraulic unit according to claim 1 or 2, wherein the thickness of each of the block plates (4₁ to 4₅) is set to a value which permits press working for the plate.

* * * * *